United States Patent

[11] 3,620,549

| | | | |
|---|---|---|---|
| [72] | Inventors | Robert G. Miller;<br>Ernest H. Radaker, both of Pittsburgh, Pa. | |
| [21] | Appl. No. | 863,082 | |
| [22] | Filed | Oct. 2, 1969 | |
| [45] | Patented | Nov. 16, 1971 | |
| [73] | Assignee | Phillips Mine & Mill Supply Co.<br>Bridgeville, Pa. | |

[54] INDUSTRIAL TRAILER WITH SELECTIVE ONE- OR TWO-END STEERING
5 Claims, 4 Drawing Figs.

[52] U.S. Cl............................................... 280/99,
280/445
[51] Int. Cl...................................................... B62d 13/06
[50] Field of Search............................................ 280/99,
445, 444, 102

[56] References Cited
UNITED STATES PATENTS
| | | | | |
|---|---|---|---|---|
| 1,242,223 | 10/1917 | Mueller | | 280/102 |
| 1,312,788 | 8/1919 | Keller | | 280/445 |
| 1,925,712 | 9/1933 | Campbell | | 280/99 |
| 2,650,100 | 8/1953 | Ronning | | 280/445 X |
| 2,701,143 | 2/1955 | Taylor et al. | | 280/99 |
| 3,529,848 | 9/1970 | Harvey | | 280/99 |

*Primary Examiner*—Leo Friaglia
*Attorney*—Parmelee, Utzler & Welsh

ABSTRACT: There is disclosed a four-wheeled vehicle having two swiveled front wheels and two swiveled rear wheels. There is a tong or drawbar at the front that rotates in an arc about a pivot and which is connected with the front wheels to steer the vehicle in the direction to which the drawbar is turned. There is a block rotatable about the same point with cross links attached thereto and connected with the rear wheels. A latch selectively connects this block with the vehicle body to hold the block and rear wheels from swiveling or for connecting the block for arcuate movement with the drawbar to simultaneously swivel the front and back wheels.

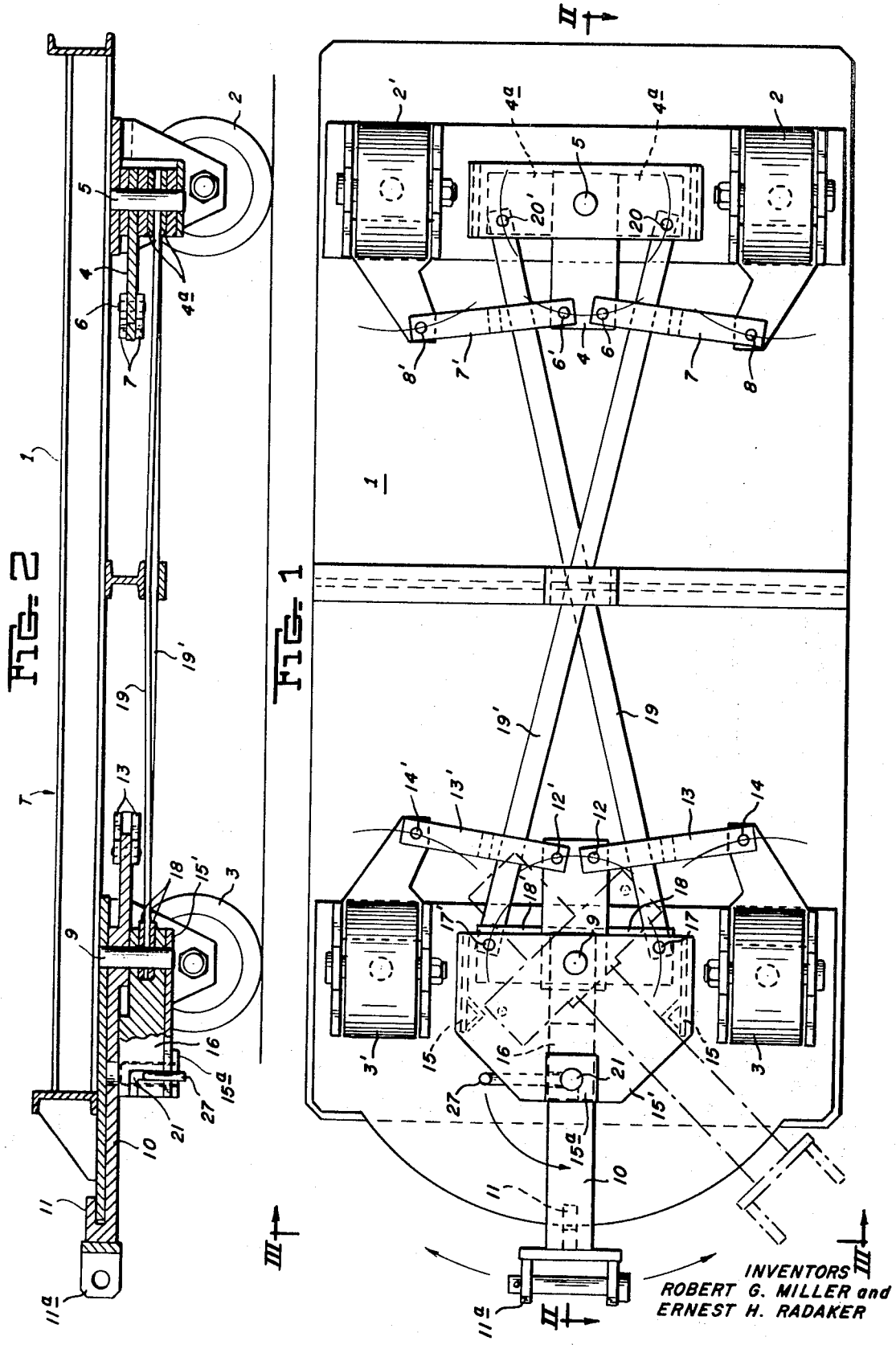

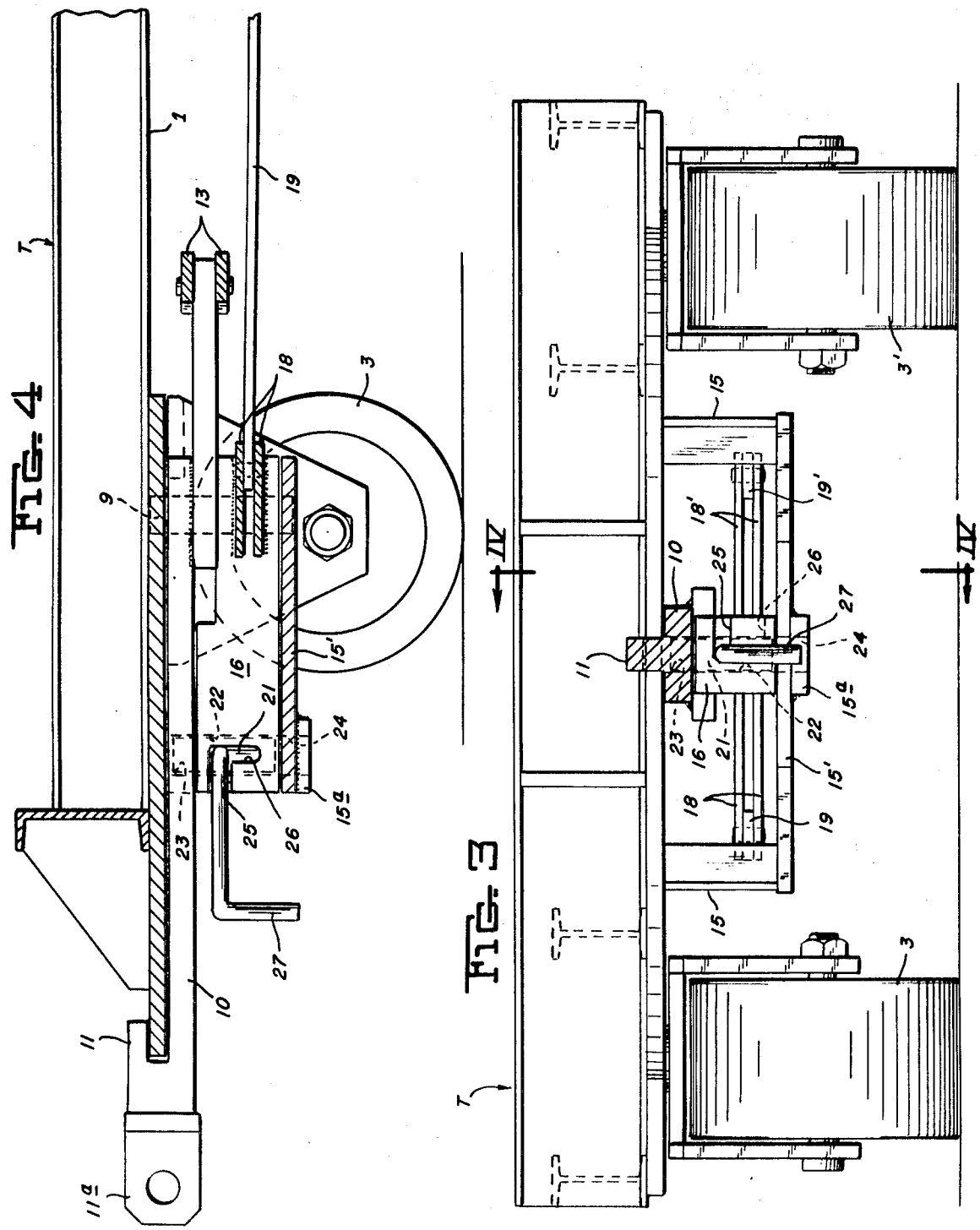

INDUSTRIAL TRAILER WITH SELECTIVE ONE- OR TWO-END STEERING

FIELD OF THE INVENTION

This invention relates to a four-wheeled vehicle and for a vehicle especially useful as an industrial vehicle in which only the two front wheels will turn with the tongue or drawbar to steer the vehicle or in which both the front and rear wheels will both change their direction as the drawbar is pulled to one side or the other.

BACKGROUND

Industrial trailers for use in and about mills, factories, dock and other industrial areas are hitched to a tractor that moves them from one place to another. Those for use indoors and confined areas commonly have dirigible front and back wheels so that the vehicle can make sharper turns. However, it is difficult to steer such trailers when backing, even for an experienced tractor operator. Trailers with only front end steering are much easier to guide in backing, but they cannot turn nearly as sharply as trailers with two end steering, so that they are more commonly used out of doors where less sharp turns and more backing may be required.

The present invention provides a trailer that may quickly be converted from only front end steering to front and rear end steering, or vice versa so that it may be moved from one environment to another and by operation of a single slide bolt converted to front only or four-wheel steering, as may be desired or necessary.

BRIEF SUMMARY OF THE INVENTION

According to this invention the body or frame of the vehicle is supported on a pair of dirigible front wheels and a pair of dirigible rear wheels. There is a drawbar at the front end that pivots from side to side in a horizontal arc about a king pin and a linkage transmits a steering motion from the drawbar to the front wheels so that they turn in the direction in which the drawbar points. Another member or block that pivots about the same king pin is provided as is a cross linkage that transmits steering motion from this member, when it turns with the drawbar to the dirigible rear wheels. There is a latch that is selectively operable to connect said member to turn with the draw bar, in which case all four wheels steer, or operable to lock said member to the frame and hold it against turning with the drawbar, in which there is only front end steering and the rear wheels are held in a straight forward position relative to the frame.

BRIEF DESCRIPTION OF THE DRAWINGS

FIG. 1 is a plan view of the underside of the trailer of the present invention showing the arc through which the drawbar moves and the connecting means for the dirigible wheels;

FIG. 2 is a sectional view taken along the plane of lines II—II of FIG. 1 showing the pivotal member in engagement with the trailer frame whereby the trailer is steered by the front pair of wheels only:

FIG. 3 is an elevational view of the pivotal member, taken along the plane of lines III—III of FIG. 1, showing it in engagement with the draw bar for steering of the trailer by both front and rear pairs of wheels; and FIG. 4 is a more detailed view of the front section of the trailer taken along the plane of lines IV—IV of FIG. 3.

DETAILED DESCRIPTION

Referring to the drawings, FIG. 1 illustrates a trailer T having a frame 1, a pair of dirigible rear wheels 2 and 2' pivotally mounted along a vertical axis to the frame 1 adjacent to and transverse the frame at the rear end, and a similar pair of dirigible front wheels 3 and 3' likewise mounted near the front end of the frame. A support member 4, positioned between the rear wheels 2 and 2' is pivotally connected to the underside of the frame by pivot means 5. Support member is also pivotally connected at 6 and 6' to linking arms 7 and 7' which are in turn pivotally connected at 8 and 8' to the rear wheels. A cross bar 4a is provided on support member 4 which connects with linking means to the front steering mechanism as more fully described hereinafter. Adjacent the front end of the trailer and movable in a horizontal arc there is pivotally connected to the frame 1, by pivot means 9, a drawbar or tongue 10. A section 11 of the drawbar 10 extends past the front end of the trailer frame so as to be easily attached to a towing vehicle or to a preceding trailer in a train of trailers by attachment means 11a for movement of the trailer. The drawbar has attached means for transmitting steering motion from the drawbar to the front wheels to steer them in the direction to which the drawbar is turned. As illustrated, the drawbar 10 is pivotally attached at 12 and 12' to forward linking arms 13 and 13' which are, in turn, pivotally attached at 14 and 14' to the front wheels 3 and 3'.

In order to transmit steering motion from the drawbar to the rear wheels to permit two-end steering, or to hold the rear wheels against steering motion for one-end steering only, a means is provided to permit selective movement of the rear wheels with the drawbar or holding of the rear wheels against movement with the drawbar. As illustrated, positioned within a housing 15 attached to the frame, through which the drawbar 10 extends, there is a movable member such as a slidable block 16, The movable member 16, is generally intermediate the front wheels 3 and 3' and situated between frame 1 and the lower portion 15' of the housing 15, and is movable in a horizontal arc such as that through which the drawbar turns. The movable member 16 is pivotally attached to the frame by means of pivot means 9, through which the drawbar is also attached to the frame. Attached to the movable member 16 by pivot means 17 and 17' which are preferably carried by connecting arms 18 and 18' are linking means 19 and 19'. Linking means 19 and 19' transmit steering motion to the rear wheels from the drawbar 10, when the movable member 16 is movable with the drawbar, the member 16 is being connected with the crossbar 4a at pivot means 20 and 20' on support member 4 at the rear of the trailer frame.

A latch means, such as selector pin 21 is provided within an aperture in the movable member 16 which permits selective operation to transmit steering motion to the rear wheels from the drawbar or to restrict them from pivotal movement and hold them in a straight forward position for front end steering only. The aperture 22, when the movable member 16 is generally coaxial with the drawbar 10 and frame 1, is aligned with cooperating apertures 23 in the drawbar and 24 in the lower portion 15' of the housing. A horizontal slot 25 is provided in the movable member 16 cooperating with aperture 22 and has a downwardly extending leg 26, coaxial with aperture 22. A handle 27, attached to the selector pin 21 extends through the slot and provides for manual vertical movement of pin 21. When the selector pin 21 is in a downward position, as shown in FIG. 2, it extends into aperture 24 in the lower portion 15' and brace plate 15a which provides reinforcement for the lower portion 15. When the pin 21 so extends into the lower portion 15,' it prevents relative horizontal movement between the movable member 16 and the housing 15 of frame 1, and fixes the member 16 against pivotal movement with the drawbar. In this position, the selector pin 21 holds the movable member 16 against movement with the drawbar 10 and rear wheels are held in a straight forward position. Thus, while the drawbar is pivotable at pivot means 9 to move the front wheels 3 and 3' to steer the trailer by means of the front wheels, the rear wheels are held straight forward and provide for easy backing of the trailer. The handle 27 is, when the selector pin 21 is in its lower position, situated in the downwardly extending leg 26 of slot 25.

Alternatively, when the selector pin 21 is in an upward position, as shown in FIGS. 3 and 4, it extends into aperture 23 in the drawbar 10, and the movable member 16 is then movable with the drawbar. Being so movable, and free of engagement with the frame, the movable member will travel horizontally within the housing 15 in unison with movement of the drawbar 10 to transmit steering motion from the drawbar to the rear wheels. When so operative, the connections between the movable member 16 and the rear wheels transmit steering motion to the rear wheels from the drawbar. In this arrangement, the handle 27 of selector pin 21 extends out of the horizontal slot 25, generally coaxial with the frame 1. Movement of the movable member 16 with drawbar 10 provides for movement of the linking means 19 and 19' which are attached to the movable member 16 and support member 4 at the rear of the frame, so that the rear wheels 2 and 2' pivot therewith in an opposite direction from those at front. The drawbar 10 thus provides movement of both the front wheels 3 and 3' and the rear wheels 2 and 2' so that the trailer will turn about a short arc.

The wheel front wheels 3 and 3' and rear wheels 2 and 2' are of a conventional structure, and where more than one pair of said wheels are proved at each end of the frame 1, an arrangement such as described in U.S. Pat. No. 2,816,774 to R. G. Miller, a coinventor of the present invention, may be used.

There has been described a novel and useful steering arrangement for industrial trailers where the trailer may be steered by means of a front pair of wheels only, to provide easy backing of the trailer, with ready adjustment to give the desired steering arrangement.

We claim:

1. A trailer having a frame, a first pair of dirigible wheels adjacent the front end and a second pair of dirigible wheels adjacent the rear end of the frame, a support member pivotally connected to the frame adjacent the rear end having a crossbar thereon and means to pivotally connect the support member to the second pair of wheels, a drawbar pivotally connected to the front end of the frame with a section of the drawbar extending past the front end, means to pivotally connect the drawbar to the first pair of wheels, a housing fixed adjacent to the front end of the frame through which the drawbar extends, a movable member within the housing, linking means pivotally connecting the movable member with the crossbar of the said support member, and means for alternatively engaging the movable member with the drawbar and with the housing, whereby when the movable member is engaged to and movable with the drawbar, both pairs of wheels are pivotable with the drawbar and when the locking means is engaged with the housing, the first pair of wheels is pivotable with the drawbar while the second pair of wheels is restricted against pivotable movement.

2. The trailer specified in claim 1, wherein said movable member comprises a slidable block, movable in unison with the drawbar when engaged thereto.

3. The trailer specified in claim 1, wherein aligned apertures are provided through the drawbar, the movable member, and the housing, and the means for alternatively engaging the movable member with the drawbar and with the housing comprises a selector pin disposed within the aligned apertures which selector pin is movable from a position within the drawbar and movable member apertures, to a position within the movable member and housing apertures to thereby effect the alternative engagement which allows for steering of only the first pair of wheels or steering of each pair of wheels.

4. The trailer specified in claim 3, wherein said selector pin is connected to a handle which extends out of the housing whereby the selector pin is readily movable to effect the alternative engagement.

5. In an industrial trailer having a frame, a first pair of wheels adjacent the front end and a second pair of wheels adjacent the rear end of the frame, a support member pivotally connected to the frame adjacent the rear end having a crossbar thereon and means to pivotally connect the support member to the second pair of wheels, a drawbar pivotally connected to the front end of the frame with a section of the drawbar extending past the front end, means pivotally connecting the drawbar to the first pair of wheels and linking means pivotally connecting said front and rear pairs of wheels so that movement of the drawbar in a horizontal direction will move the front pair of wheels in the same direction while the rear pair of wheels turn in the opposite direction, the improvement comprising a housing adjacently fixed to the front end of the frame through which said drawbar extends a movable member within the housing with said linking means connected to said movable member and said crossbar, and means for alternatively engaging the movable member with the drawbar and with the housing, whereby when the movable member is engaged to and movable with the drawbar the first and second pairs of wheels are pivotable with the drawbar and when the movable member is engaged with the housing, the first pair of wheels only is pivotable with the drawbar.

* * * * *